United States Patent
Zhang et al.

(10) Patent No.: US 8,817,724 B2
(45) Date of Patent: Aug. 26, 2014

(54) SENDING METHOD, SYSTEM AND DEVICE FOR ENHANCED DEDICATED RANDOM ACCESS UPLINK CONTROL CHANNEL

(75) Inventors: Ying Zhang, Beijing (CN); Liang Qi, Beijing (CN); Xiaoka Li, Beijing (CN)

(73) Assignee: China Academy of Telecommunications Technology (CN)

( * ) Notice: Subject to any disclaimer, the term of this patent is extended or adjusted under 35 U.S.C. 154(b) by 241 days.

(21) Appl. No.: 13/321,114

(22) PCT Filed: May 18, 2010

(86) PCT No.: PCT/CN2010/072877
§ 371 (c)(1),
(2), (4) Date: Mar. 7, 2012

(87) PCT Pub. No.: WO2010/133162
PCT Pub. Date: Nov. 25, 2010

(65) Prior Publication Data
US 2012/0155400 A1    Jun. 21, 2012

(30) Foreign Application Priority Data

May 18, 2009   (CN) .......................... 2009 1 0084582

(51) Int. Cl.
*H04W 4/00* (2009.01)
*H04W 72/04* (2009.01)
(52) U.S. Cl.
CPC ................................... *H04W 72/04* (2013.01)
USPC .......................................... 370/329; 370/341
(58) Field of Classification Search
CPC .............. H04W 72/12; H04W 74/002; H04W 74/0833; H04W 74/0891; H04W 72/04
USPC ......... 370/329, 331, 337, 341, 344, 347, 348, 370/350
See application file for complete search history.

(56) References Cited

U.S. PATENT DOCUMENTS

| | | | |
|---|---|---|---|
| 2004/0264413 A1* | 12/2004 | Kaidar et al. | 370/332 |
| 2007/0160003 A1* | 7/2007 | Meier | 370/329 |
| 2007/0195730 A1* | 8/2007 | Cheng et al. | 370/329 |

(Continued)

FOREIGN PATENT DOCUMENTS

| | | |
|---|---|---|
| CN | 101123467 | 2/2008 |
| CN | 101247647 | 8/2008 |

(Continued)

OTHER PUBLICATIONS

International Search Report from corresponding application No. PCT/CN2010/072877.

*Primary Examiner* — Ricky Ngo
*Assistant Examiner* — Kabir Jahangir
(74) *Attorney, Agent, or Firm* — Lowe Hauptman & Ham, LLP

(57) ABSTRACT

The present invention discloses a method, system and device for transmitting an E-DCH Random Access Uplink Control Channel (E-RUCCH), where the method includes: a UE judging whether a plurality of E-RUCCH transmission processes temporally overlap; and if there is overlapping, then the UE selecting and performing one of the E-RUCCH transmission processes and returning scheduling information and the identifier of the UE to a base station over an E-RUCCH. The method addresses the problem of coordination between E-RUCCH transmission processes triggered due to various reasons in a TD-SCDMA system with the enhanced feature of CELL_FACH introduced thereto.

16 Claims, 4 Drawing Sheets

(56) References Cited

U.S. PATENT DOCUMENTS

| | | |
|---|---|---|
| 2008/0037474 A1* | 2/2008 | Niwano .................. 370/335 |
| 2008/0069280 A1* | 3/2008 | Wang et al. .............. 375/363 |
| 2009/0111477 A1* | 4/2009 | Tsutsui .................. 455/450 |
| 2009/0135769 A1* | 5/2009 | Sambhwani et al. ...... 370/329 |
| 2009/0318175 A1* | 12/2009 | Sandberg ................ 455/502 |
| 2010/0165953 A1* | 7/2010 | Chen et al. .............. 370/335 |

FOREIGN PATENT DOCUMENTS

| | | |
|---|---|---|
| CN | 101420756 | 4/2009 |
| WO | WO 2008/025233 | 3/2008 |
| WO | WO 2009/046061 | 4/2009 |

* cited by examiner ial Application Number PCT/CN2010/072877, filed May 18, 2010 and claims priority from, China Application Number 200910084582.5, filed May 18, 2009.

SENDING METHOD, SYSTEM AND DEVICE FOR ENHANCED DEDICATED RANDOM ACCESS UPLINK CONTROL CHANNEL

RELATED APPLICATIONS

The present application is a National Phase of International Application Number PCT/CN2010/072877, filed May 18, 2010 and claims priority from, China Application Number 200910084582.5, filed May 18, 2009.

FIELD OF THE INVENTION

The present invention relates to the field of communications and in particular to a method, system, and device for transmitting an uplink enhanced random access channel.

BACKGROUND OF THE INVENTION

The technology of High Speed Uplink Packet Access (HSUPA) introduced in the 3GPP R7 as an uplink enhanced solution is intended to improve the uplink peak rate of a user and the throughput of a system.

A series of enhanced channels and corresponding data transmission mechanisms have been introduced in the technology of High Speed Uplink Packet Access (HSUPA): when a User Equipment (UE) intended to transmit uplink Enhanced Dedicated Channel (E-DCH) data, Scheduling Information (SI) will be transmitted to a base station over an E-DCH Random Access Uplink Control Channel (E-RUCCH) or an Enhanced Uplink Physical Channel (E-PUCH) to signal the amount of currently buffered data of the UE and other relevant information to the base station. Particularly if the UE has a granted resource, then the UE carries the SI information in an MAC-e PDU and transmits it to the base station over the E-PUCH channel; on the contrary, if the UE has no granted resource, then the UE has to transmit the SI information to the base station over the E-RUCCH channel. Next the base station grants a physical resource available to the UE over an E-DCH Absolute Grant Channel (E-AGCH); and thereafter the UE transmits uplink enhanced service data over an E-DCH Physical Uplink Channel (E-PUCH); and finally the base station feeds back ACK/NACK information to the UE over an uplink enhanced acknowledgement indicator channel.

In the 3GPP R8, the enhanced feature of CELL_FACH has also been introduced for a TD-SCDMA system by introducing the status of CELL_FACH to an HSPA resource (including HSUPA and HSDPA-related transport and physical channels) and a corresponding transport mechanism so that the features of HSUPA and HSDPA have to be supported to accommodate a CELL_FACH enhancement requirement. A UE is allowed in the enhanced status of CELL_FACH to be out of uplink synchronization, so when a base station has downlink data to be transmitted to a UE, the base station detects the UE out of uplink synchronization based upon a timer and initiates a UE uplink resynchronization process for the UE out of uplink synchronization by firstly instructs in an HS-SCCH command (downlink physical layer control signaling) the UE to initiate the uplink synchronization process; and the UE transmits an E-RUCCH to the base station to acknowledge finished synchronization after transmitting an SYNC_UL, receiving an FAPCH and performing successful uplink synchronization upon reception of the synchronization command, and then the base station transmits downlink data. It shall be noted that the E-RUCCH has not been structurally changed with CELL_FACH enhancement, that is, information borne over the E-RUCCH has not been changed relative to an HSUPA, so SI information is also borne over the E-RUCCH.

Furthermore, a user equipment with CELL_FACH enhancement transmits data over an E-DCH in the uplink and receives data over a High-Speed Downlink Shared Channel (HS-DSCH) in the downlink. With an improved peak rate of data, if the UE stills reselects a cell by itself without signaling to a network, the period of a system message typically may be up to 1.28 s, and only after the UE reads a system broadcast upon reselection of a cell, the UE can transmit a cell update message in the new cell and the specific cell where the UE resides can be known to the network side, then it is unknown to the network whether the UE has reselected any cell before the UE reselects the new cell, that is, before the network receives the updated cell, and if a base station continues with scheduling the UE, then the problems of a waste of resources and a possible loss of data may arise, and a cell reselection indicator process has been proposed to address the problems.

Specifically, in the cell reselection indicator process, the UE performs a cell reselection criterion; and after a cell reselection condition is satisfied, the UE judges whether a cell reselection indicator transmission condition is satisfied, and if it is satisfied, then the UE transmits a cell reselection indicator to the base station and reselects a cell after transmitting the cell reselection indicator. Particularly in the process of transmitting the cell reselection indicator, for uplink data transmission, if the UE transmits information of TEBS>0 but not TEBS=0 to the base station, then the cell reselection indicator transmission condition is triggered; and then the UE judges if there is a grant in a next Transmission Time Interval (TTI) or an extended estimation window, then the UE transmits the cell reselection indicator represented as TEBS=0 and HLBS="1111" over an E-PUCH; or if there is E-PUCH grant in the next TTI or the extended window, then the UE initiates an E-RUCCH process by transmitting the cell reselection indicator represented as TEBS=0 and HLBS="1111" to the base station. The largest number of synchronizations is set to 1 for transmission of the cell reselection indicator from the UE in the E-RUCCH process, and if the E-RUCCH process fails to be performed in a physical layer random access process, then the UE stops the cell reselection indicator from being transmitted and reselects a cell. For downlink data reception, if cell reselection is triggered during reception of downlink data, then the user equipment carries RTBS=0 as the cell reselection indicator over an HS-SICH. If there is uplink synchronization ongoing for the user equipment, then the user equipment carries and signals information of TEBS=0 and HLBS="1111" in an E-RUCCH process to the base station.

As can be apparent from the foregoing description, the UE with uplink E-DCH data to be transmitted transmits the SI information to the base station over the E-RUCCH channel, and if the UE with the enhanced feature of CELL-FACH is out of uplink synchronization, then the UE also transmits the E-RUCCH to acknowledge finished synchronization upon reception of the synchronization command from the base station, but the E-RUCCH channel has not been changed relative to the HSUPA despite the CELL-FACH, and furthermore the UE may also initiate the E-RUCCH process to transmit the cell reselection indicator represented as SI information to the base station. Therefore if the UE has uplink E-DCH data to be transmitted and the UE also has downlink data to be transmitted while the UE out of uplink synchronization performs the cell reselection indicator process, then the base station may not know whether the E-RUCCH returned from the UE is to acknowledge finished synchronization, to transmit SI information to apply for a scheduling grant or to signal cell reselection upon reception of the E-RUCCH, which may disordering the processes of the base station and the UE.

SUMMARY OF THE INVENTION

An object of the invention is to address at least one of the drawbacks in the prior art and particularly disordered processes of a base station and a UE in the prior art.

In order to attain the foregoing object, an aspect of the invention proposes a method for transmitting an E-DCH Random Access Uplink Control Channel transmission process, which includes the steps of: a UE judging whether a plurality of E-RUCCH transmission processes temporally overlap; and if the UE judges overlapping, then the UE selecting to perform one of the E-RUCCH transmission processes and returning SI and the identifier of the UE to a base station over an E-RUCCH.

Furthermore the method further includes: the base station receiving the SI and the identifier of the UE transmitted from the UE, determining the UE to be in uplink synchronous status, and using the SI to assist in scheduling by the base station.

Preferably the UE selects to perform the highest-priority one of the E-RUCCH transmission processes according to their priorities.

Preferably the plurality of E-RUCCH transmission processes include an E-RUCCH transmission process triggered due to transmission of E-DCH data from the UE, an E-RUCCH transmission process triggered due to uplink synchronization by the base station, and an E-RUCCH transmission process triggered due to transmission of a cell reselection indicator from the UE.

If the E-RUCCH transmission process triggered due to transmission of the cell reselection indicator from the UE temporally overlaps with another E-RUCCH transmission process, then the UE selects to perform the E-RUCCH transmission process triggered due to transmission of the cell reselection indicator from the UE, and stops or cancels all other ongoing E-RUCCH transmission processes, and triggers none of other E-RUCCH transmission processes while the E-RUCCH transmission process triggered due to transmission of the cell reselection indicator from the UE and other E-RUCCH transmission processes are performed.

If the E-RUCCH transmission process triggered due to transmission of the E-DCH data from the UE temporally overlaps with the E-RUCCH transmission process triggered due to uplink synchronization by the base station, then the UE selects to perform the E-RUCCH transmission process triggered due to transmission of the E-DCH data from the UE, and stops or cancels the E-RUCCH transmission process triggered due to uplink synchronization by the base station, and triggers no E-RUCCH transmission process triggered due to uplink synchronization by the base station while performing the E-RUCCH transmission process triggered due to transmission of the uplink E-DCH data from the UE.

Particularly the UE judging whether the E-RUCCH transmission process triggered due to transmission of the E-DCH data from the UE temporally overlaps with the E-RUCCH transmission process triggered due to uplink synchronization by the base station includes: the UE deciding to perform the E-RUCCH transmission process triggered due to transmission of the E-DCH data from the UE and transmitting an enhanced uplink synchronization code to the base station to trigger an enhanced random access process; and if the UE receives a synchronization command from the base station before transmitting the SI to the base station, then the UE judging that the E-RUCCH transmission process triggered due to transmission of the E-DCH data from the UE temporally overlaps with the E-RUCCH transmission process triggered due to uplink synchronization by the base station.

On the other hand, the UE judging whether the E-RUCCH transmission process triggered due to transmission of the E-DCH data from the UE temporally overlaps with the E-RUCCH transmission process triggered due to uplink synchronization by the base station includes: the UE receiving a synchronization command from the base station; if the UE performs the E-RUCCH transmission process triggered due to transmission of the E-DCH data from the UE before returning the E-RUCCH to the base station to acknowledge finished synchronization, then the UE judging that the E-RUCCH transmission process triggered due to transmission of the E-DCH data from the UE temporally overlaps with the E-RUCCH transmission process triggered due to uplink synchronization by the base station.

Preferably the UE determines, from the amount of data in a buffer area, total enhanced dedicated channel buffer status information in the SI carried over the E-RUCCH.

Preferably the E-RUCCH transmission process triggered due to transmission of the E-DCH data from the UE is an E-RUCCH transmission process due to expiration of a T-Wait timer, an E-RUCCH transmission process triggered due to a buffer changing from zero to larger than zero or an E-RUCCH transmission process triggered due to a change to a serving cell or the buffer becoming larger than zero.

According to another aspect of the invention, there is proposed a system for transmitting an E-RUCCH, which includes: a UE configured to judge whether a plurality of E-RUCCH transmission processes temporally overlap, to select to perform one of the E-RUCCH transmission processes upon judging overlapping and to return SI and the identifier of the UE to a base station over an E-RUCCH; and the base station configured to receive the SI and the identifier of the UE returned over the E-RUCCH from the UE and using the SI to assist in scheduling by the base station.

According to a further aspect of the invention, there is provided a UE including: a judgment module configured to judge whether a plurality of E-RUCCH transmission processes temporally overlap; a selection module configured to select to perform one of the E-RUCCH transmission processes when the judgment module judges overlapping; and a transmission module configured to return SI and the identifier of the UE to a base station over an E-RUCCH after the E-RUCCH transmission processes is selected.

According to a still another aspect of the invention, there is provided a base station including: a reception module configured to receive SI and an identifier of a UE returned over an E-RUCCH from the UE; a synchronization determination module configured to determine, from the SI and the identifier of the UE received by the reception module, that the UE is in the status of uplink synchronization; and an assisting scheduling module configured to assist in scheduling by the base station with the SI.

The technical solutions of the invention the invention address the problem of coordination between a plurality of E-RUCCH transmission processes triggered due to various reasons in a TD-SCDMA system with the enhanced feature of CELL_FACH introduced thereto. The inventive solutions are so simple that a UE and a base station can make effective use of an E-RUCCH channel itself and information carried thereover to acknowledge/determine synchronization and signal SI when the UE has to transmit an E-RUCCH channel due to a plurality of trigger mechanisms.

Additional aspects and advantages of the invention will partly be given in the following description, partly become apparent from the following description or be learned from practicing of the invention.

BRIEF DESCRIPTION OF THE DRAWINGS

The foregoing and/or additional aspects and advantages of the invention will become apparent and be readily appreciated from the following description of the embodiments taken in conjunction with the drawings in which.

DETAILED DESCRIPTION OF THE INVENTION

Figure 1:
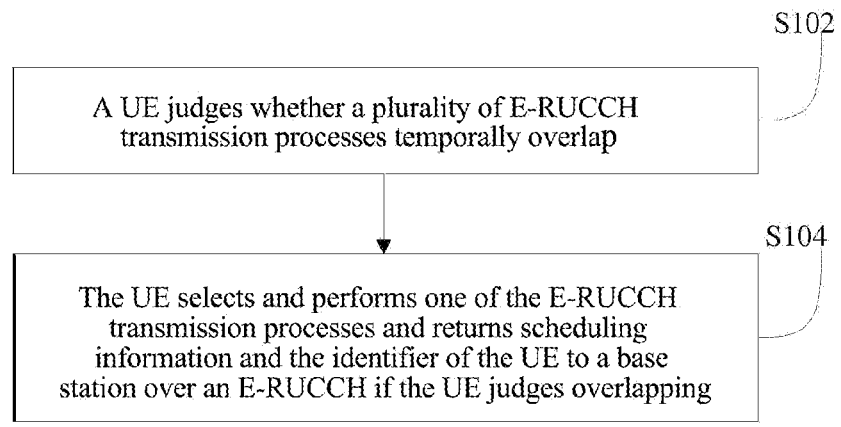
FIG. 1 is a flow chart of a method for transmitting an E-RUCCH according to the invention.

Embodiments of the invention will be detailed hereinafter, examples of which are illustrated in the drawings throughout which identical or similar reference numerals represent identical or similar elements or functionally identical or similar elements. The embodiments described below with reference to the drawings are illustrative and merely intended to explain but not limit the invention.

An essence of the invention primarily lies in that if E-RUCCH transmission processes triggered due to various reasons temporally overlap, then a UE may select to perform one of the E-RUCCH transmission processes and transmit SI and the identifier of the UE (e.g., a UE ID, etc.) to a base station over an E-RUCCH, so that the base station can use the information over the E-RUCCH to assist in scheduling by the base station upon reception of the information. Particularly, Total E-DCH Buffer Status (TEBS) information in the SI can reflect information on current E-DCH data to be transmitted in a buffer area of the UE.

FIG. 1 is a flow chart of a method for transmitting an E-RUCCH according to the invention.

Referring to FIG. 1, the method includes the step S102 of a UE judging whether a plurality of E-RUCCH transmission processes temporally overlap, and the step S104 of the UE selecting to perform one of the E-RUCCH transmission processes and returning scheduling information and the identifier of the UE to a base station over an E-RUCCH if the UE judges overlapping.

Furthermore the method further includes the base station receiving the scheduling information and the identifier of the UE transmitted from the UE, determining uplink synchronous status of the UE and using the SI to assist in scheduling by the base station.

Preferably the UE selects to perform the highest-priority one of the E-RUCCH transmission processes according to their priorities.

According to the invention, there are various scenarios in which E-RUCCH transmission processes triggered due to various reasons (e.g., an E-RUCCH process triggered due to transmission of uplink E-DCH data from a UE, an E-RUCCH process transmission process triggered due to uplink synchronization by a base station and an E-RUCCH transmission process triggered due to transmission of a cell reselection indicator from a UE) temporally overlap, and a scenario in which an E-RUCCH process triggered due to transmission of E-DCH data from a UE temporally overlaps with an E-RUCCH transmission process triggered due to uplink synchronization by a base station will be detailed below as an example.

Specifically there are two scenarios in which E-RUCCH transmission triggered due to transmission of uplink E-DCH data from a UE temporally overlaps with E-RUCCH transmission triggered due to uplink synchronization by a base station and will be described in details below respectively in the following first and second embodiments.

The First Embodiment

Figure 2:
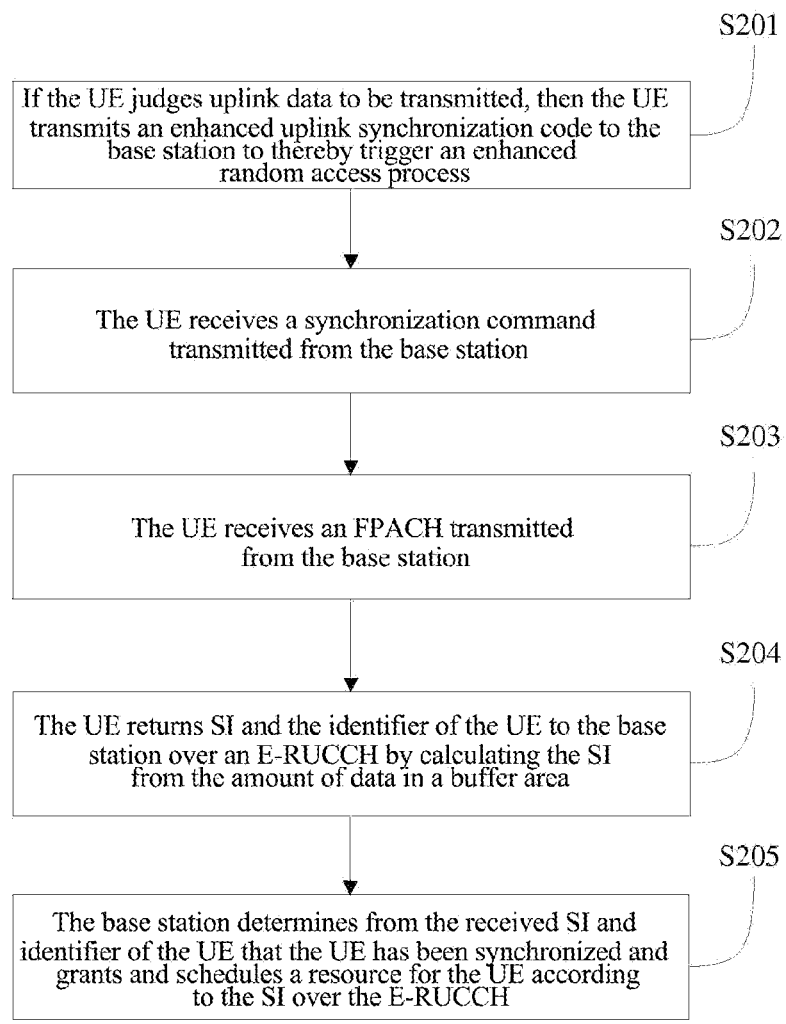
FIG. 2 is a flow chart of a method for transmitting an E-RUCCH according to a first embodiment of the invention.

In this embodiment, firstly a UE has uplink data to be transmitted, and the UE receives a synchronization command transmitted from a base station after transmitting an enhanced uplink synchronization (SYNC_UL) code, which indicates temporal overlapping of E-RUCCH transmission triggered due to transmission of the uplink data with E-RUCCH transmission triggered due to uplink synchronization by the base station. FIG. 2 illustrates a flow chart of a method for transmitting an E-DCH Random Access Uplink Control Channel according to the first embodiment of the invention, and the method includes the following steps:

In the step S201, if the UE judges uplink E-DCH data to be transmitted, then the UE transmits an enhanced uplink synchronization (SYNC_UL) code to the base station to thereby trigger an enhanced random access process.

In the step S202, the UE receives a synchronization command transmitted from the base station, which indicates that at this time the base station also has downlink data to be transmitted to the UE, and the base station judges that the UE is out of uplink synchronization and hence will be synchronized. The UE judges, at this time, temporal overlapping of an E-DCH Random Access Uplink Control Channel (E-RUCCH) transmission process triggered due to transmission of the uplink E-DCH data with an E-RUCCH transmission process triggered due to uplink synchronization by the base station and therefore will not reinitiate any enhanced random access process, that is, the UE selects to perform the E-DCH Random Access Uplink Control Channel (E-RUCCH) transmission process triggered due to transmission of the uplink E-DCH data, and stops or cancels the E-RUCCH transmission process triggered due to uplink synchronization by the base station and will not trigger any E-RUCCH transmission process triggered due to uplink synchronization by the base station in an E-RUCCH transmission process triggered to transmission of a cell reselection indicator from the UE or other E-RUCCH transmission processes. Therefore, in this embodiment the UE will initiate only one enhanced random access process to thereby obviate the problem of disordering processes of the base station and the UE.

In the step S203, the UE receives an FPACH transmitted from the base station.

In the step S204, the UE returns SI and the identifier of the UE to the base station over an E-RUCCH by calculating TEBS information in the SI from the amount of data in a buffer area.

In the step S205, the base station determines from the received SI and identifier of the UE that the UE has been synchronized and grants and schedules a resource for the UE according to the SI over the E-RUCCH.

The Second Embodiment

Figure 3:
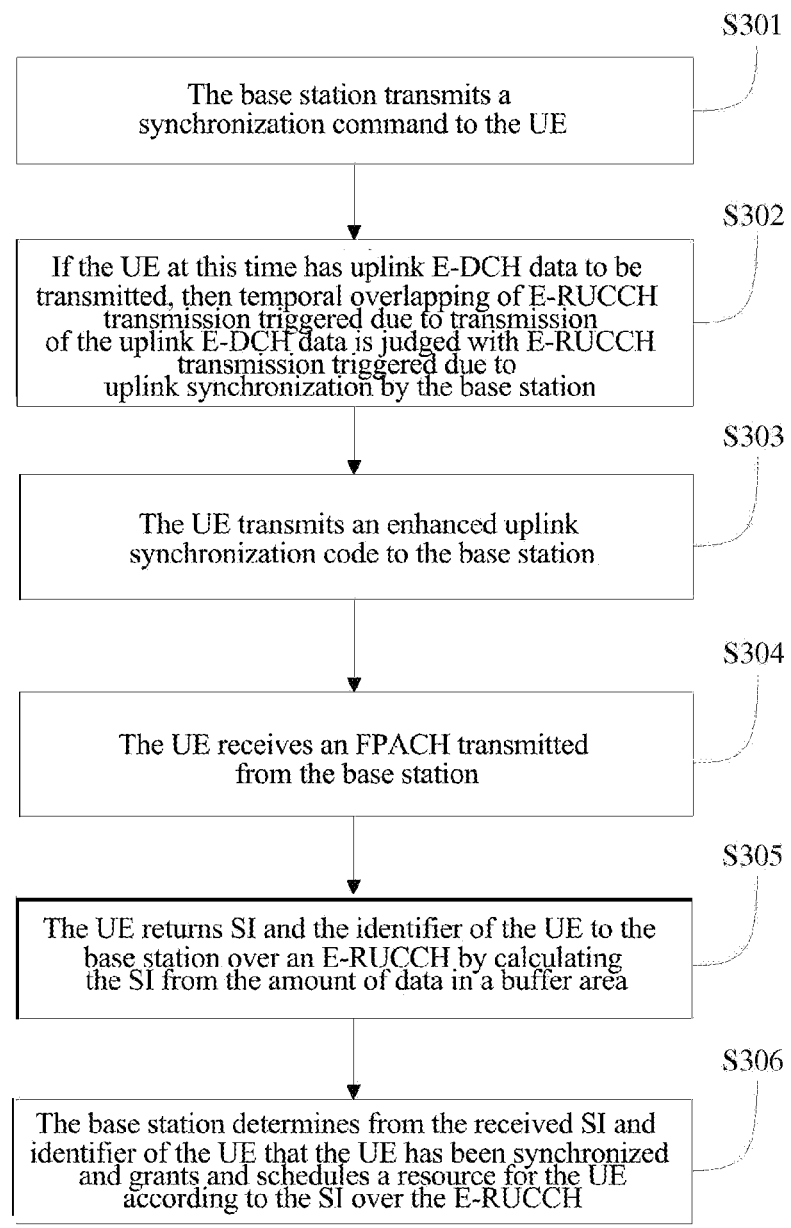
FIG. 3 is a flow chart of a method for transmitting an E-RUCCH according to a second embodiment of the invention.

In this embodiment, firstly a UE receives a synchronization command transmitted from a base station and thereafter if there is data to be transmitted to the base station, then it indicates temporal overlapping of E-RUCCH transmission triggered due to transmission of uplink E-DCH data with E-RUCCH transmission triggered to uplink synchronization by the base station. FIG. 3 illustrates a flow chart of a method for transmitting an E-DCH Random Access Uplink Control Channel according to the second embodiment of the invention, and the method includes the following steps:

In the step S301, the base station transmits a synchronization command to the UE when the base station has data to be transmitted to the UE and judges that the UE is out of uplink synchronization.

In the step S302, if the UE, at this time, has uplink data to be transmitted, then it means that an E-RUCCH transmission process triggered due to transmission of the uplink E-DCH data temporally overlaps with an E-RUCCH transmission process triggered due to uplink synchronization by the base station, and at this time the UE selects to perform the E-DCH Random Access Uplink Control Channel transmission process triggered due to transmission of the uplink E-DCH data, and stops or cancels the E-RUCCH transmission process triggered due to uplink synchronization by the base station and will not trigger any E-RUCCH transmission process triggered due to uplink synchronization by the base station in an E-RUCCH transmission process triggered to transmission of a cell reselection indicator from the UE or other E-RUCCH transmission processes.

In the step S303, the UE transmits an enhanced uplink synchronization code (SYNC_UL code) to the base station.

In the step S304, the UE receives an FPACH transmitted from the base station.

In the step S305, the UE returns SI and the identifier of the UE to the base station over an E-RUCCH by calculating TEBS information in the SI from the amount of data in a buffer area.

In the step S306, the base station determines, from the received SI and identifier of the UE, that the UE has been synchronized and grants and schedules a resource for the UE according to the SI over the E-RUCCH.

Noted that the foregoing two embodiments merely illustrate specific handling of the scenario in which E-RUCCH transmission triggered due to transmission of uplink E-DCH data from the UE temporally overlaps with E-RUCCH transmission triggered due to uplink synchronization by the base station, but those skilled in the art shall appreciate that the invention will not be limited thereto.

For example the invention can also be applicable to specific handling of the scenario in which an E-RUCCH transmission process triggered due to transmission of uplink E-DCH data from the UE, an E-RUCCH transmission process triggered due to uplink synchronization by the base station and an E-RUCCH transmission process triggered due to transmission of a cell reselection indicator from the UE or two of the E-RUCCH transmission processes temporally overlap or a scenario in which more than three E-RUCCH transmission processes temporally overlap so long as the UE selects to perform the highest-priority of these E-RUCCH transmission processes according to their priorities, and stops or cancels other E-RUCCH transmission processes and will not perform any other E-RUCCH transmission process while performing the selected E-RUCCH transmission process, and the UE will also transmit information of SI, an UE ID, etc., to the base station dependent upon the selected E-RUCCH transmission process, and thereafter the base station will determine from the information that the UE has been uplink-synchronized and performs with the information such processes of scheduling and granting a resource, etc.

It shall further be noted that in the foregoing two embodiments, the base station determines from the received SI and identifier of the UE that the UE has been synchronized, and grants and schedules a resource for the UE according to the SI over the E-RCCH, but those skilled in the art shall appreciate that the base station may not necessarily schedule the UE immediately upon reception of the SI but instead may determine whether to schedule the UE according to current resources and a load of the base station, the priority of a service of the UE, the priority of the UE itself and another factor(s) and subsequently can use the SI to assist in granting and scheduling a resource upon deciding a grant.

The foregoing two embodiments are merely specific implementations of the invention, and those skilled in the art can make equivalent modifications or variations to the following embodiments without departing from the scope of the invention.

Figure 4:
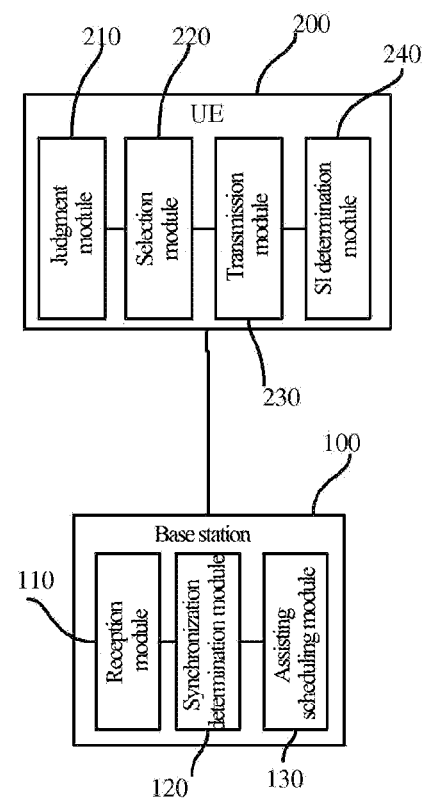
FIG. 4 is a structural diagram of a system for transmitting an E-RUCCH according to an embodiment of the invention.

Reference is made to FIG. 4 illustrating a structural diagram of a system for transmitting an E-DCH Random Access Uplink Control Channel (E-RUCCH) according to an embodiment of the invention, and the system includes a based station 100 and a UE 200. The UE 200 is configured to judge whether a plurality of E-RUCCH transmission processes temporally overlap, and to select to perform one of the E-RUCCH transmission processes upon judging overlapping, and to return scheduling information and the identifier of the UE to the base station over an E-RUCCH. The base station 100 is configured to receive the SI and the identifier of the UE returned over the E-RUCCH from the UE and to use the SI to assist in scheduling by the base station.

Particularly, the UE 200 includes a judgment module 210, a selection module 220, and a transmission module 320. The judgment module 210 is configured to judge whether the E-RUCCH transmission processes temporally overlap, the selection module 220 is configured to select to perform the one of the E-RUCCH transmission processes when the judgment module 210 judges overlapping, and the transmission module 230 is configured to return the scheduling information and the identifier of the UE to the base station 100 over the E-RUCCH after the one of the E-RUCCH transmission processes is selected.

In an embodiment of the invention, the judgment module 210 judges whether a synchronization command transmitted from the base station 100 is received after transmitting an uplink synchronization code to the base station 100 and before transmitting the SI to the base station 100 and to judge that E-RUCCH transmission triggered due to the uplink E-DCH data temporally overlaps with E-RUCCH transmission triggered due to uplink synchronization by the base station 100 upon judging reception of the synchronization command.

In another embodiment of the invention, the judgment module 210 judges whether the UE 200 has uplink E-DCH data to be transmitted after receiving a synchronization command transmitted from the base station 100 and before returning the E-RUCCH to the base station 100 to acknowledge finished synchronization, and if it is judged that the uplink E-DCH data needs to be transmitted, then the E-RUCCH transmission triggered due to transmission of the uplink E-DCH data temporally overlaps with E-RUCCH transmission triggered due to uplink synchronization by the base station 100.

Particularly the UE 200 further includes an SI determination module 240 configured to determine, from the amount of data in a buffer area, TBES information in the SI carried over the E-RUCCH.

Particularly the base station 100 includes a reception module 110, a synchronization determination module 120 and an assisting scheduling module 130. The reception module 110 is configured to receive the SI and the identifier of the UE returned over the E-RUCCH from the UE 200, the synchronization determination module 120 is configured to determine from the SI and the identifier of the UE received by the reception module that the UE has been uplink-synchronized, and the assisting scheduling module 130 is configured to use the SI over the E-RUCCH to assist in scheduling by the base station with the SI over the E-RUCCH.

As described above, the invention addresses the problem of coordination between E-RUCCH transmission processes triggered due to various reasons in a TD-SCDMA system with the enhanced feature of CELL_FACH introduced thereto. The inventive solutions are so simple that a UE and a base station can make effective use of an E-RUCCH channel itself and information carried thereover to acknowledge/determine synchronization and signal SI when the user equipment has to transmit an E-RUCCH channel due to a plurality of trigger mechanisms.

Although the embodiments of the invention have been illustrated and described, those ordinarily skilled in the art can appreciate that various variations, modifications, substitutions and adaptations can be made to these embodiments without departing from the principle and spirit of the invention as defined in the appended claims and their equivalents.

The invention claimed is:

1. A method for transmitting an Enhanced Dedicated Channel (E-DCH) Random Access Uplink Control Channel, comprising the steps of:
    judging, by a user equipment, whether a plurality of E-DCH Random Access Uplink Control Channel transmission processes temporally overlap comprising:
        transmitting an enhanced uplink synchronization code to a base station to trigger at least one of the E-DCH Random Access Uplink Control Channel transmission processes; and
        receiving a synchronization command from the base station before transmitting scheduling information to the base station; and
    if the user equipment judges overlapping, then the user equipment selecting to perform one of the E-DCH Random Access Uplink Control Channel transmission processes and returning scheduling information and an identifier of the user equipment to the base station over the E-DCH Random Access Uplink Control Channel;
    wherein the plurality of E-DCH Random Access Uplink Control Channel transmission processes comprise:
    the E-DCH Random Access Uplink Control Channel is triggered by sending E-DCH data; and
    the E-DCH Random Access Uplink Control Channel is triggered by uplink synchronization of the base station; and
    the user equipment sending E-DCH data, stopping the uplink synchronization with the base station, and does not trigger uplink synchronization of the base station while sending the E-DCH data, when the sending of E-DCH data from the user equipment temporally overlaps with the uplink synchronization with the base station.

2. The method for transmitting an E-DCH Random Access Uplink Control Channel according to claim 1, further comprising:
    receiving, by the base station, the scheduling information and the identifier of the user equipment transmitted from the user equipment, determining the user equipment to be in uplink synchronous status, and using the scheduling information to assist in scheduling by the base station.

3. The method for transmitting an E-DCH Random Access Uplink Control Channel according to claim 1, wherein:
    the user equipment selects to perform the highest-priority one of the E-DCH Random Access Uplink Control Channel transmission processes according to their priorities.

4. The method for transmitting an E-DCH Random Access Uplink Control Channel according to claim 3, wherein:
    the plurality of E-DCH Random Access Uplink Control Channel transmission processes further comprise an E-DCH Random Access Uplink Control Channel transmission process triggered due to transmission of a cell reselection indicator from the user equipment.

5. The method for transmitting an E-DCH Random Access Uplink Control Channel according to claim 4, wherein:
    if the E-DCH Random Access Uplink Control Channel transmission process triggered due to transmission of the cell reselection indicator from the user equipment temporally overlaps with another E-DCH Random Access Uplink Control Channel transmission process, then the user equipment selects to perform the E-DCH Random Access Uplink Control Channel transmission process triggered due to transmission of the cell reselection indicator from the user equipment, and stops or cancels all other ongoing E-DCH Random Access Uplink Control Channel transmission processes, and
    triggers none of other E-DCH Random Access Uplink Control Channel transmission processes while the E-DCH Random Access Uplink Control Channel transmission process triggered due to transmission of the cell reselection indicator from the user equipment is performed.

6. The method for transmitting an E-DCH Random Access Uplink Control Channel according to claim 1, wherein, the user equipment judging whether the E-DCH Random Access Uplink Control Channel transmission process triggered due to transmission of the uplink enhanced channel data from the user equipment temporally overlaps with the E-DCH Random Access Uplink Control Channel transmission process triggered due to uplink synchronization by the base station comprises: the user equipment receiving a synchronization command from the base station; if the user equipment performs the E-DCH Random Access Uplink Control Channel transmission process triggered due to transmission of the uplink enhanced channel data from the user equipment before returning the E-DCH Random Access Uplink Control Channel to the base station to acknowledge the finished synchronization, then the user equipment judging that the E-DCH Random Access Uplink Control Channel transmission process triggered due to transmission of the uplink enhanced channel data from the user equipment temporally overlaps with the E-DCH Random Access Uplink Control Channel transmission process triggered due to uplink synchronization by the base station.

7. The method for transmitting an E-DCH Random Access Uplink Control Channel according to claim 1, further comprising: the user equipment determining, from the amount of data in a buffer area, total enhanced dedicated channel buffer status information in the scheduling information carried over the E-DCH Random Access Uplink Control Channel.

8. The method for transmitting an E-DCH Random Access Uplink Control Channel according to claim 4, wherein:
    the E-DCH Random Access Uplink Control Channel transmission process triggered due to transmission of the uplink enhanced channel data from the user equipment is an E-DCH Random Access Uplink Control Channel transmission process due to expiration of a wait timer, an E-DCH Random Access Uplink Control Channel transmission process triggered due to a buffer changing from zero to larger than zero, or an E-DCH Random Access Uplink Control Channel transmission process triggered due to a change to a serving cell or the buffer becoming larger than zero.

9. A system for transmitting an Enhanced Dedicated Channel (E-DCH) Random Access Uplink Control Channel comprising:
a user equipment configured to judge whether a plurality of E-DCH Random Access Uplink Control Channel transmission processes temporally overlap comprising the steps of:
transmitting an enhanced uplink synchronization code to a base station to trigger at least one of the E-DCH Random Access Uplink Control Channel transmission processes; and
receiving a synchronization command from the base station before transmitting scheduling information to the base station,
to select to perform one of the E-DCH Random Access Uplink Control Channel transmission processes upon judging overlapping and to return scheduling information and an identifier of the user equipment to the base station over the E-DCH Random Access Uplink Control Channel; and
the base station configured to receive the scheduling information and the identifier of the user equipment returned over the E-DCH Random Access Uplink Control Channel from the user equipment and using the scheduling information to assist in scheduling by the base station;
wherein the plurality of E-DCH Random Access Uplink Control Channel transmission processes comprise the E-DCH Random Access Uplink Control Channel triggered by sending E-DCH data and triggered by uplink synchronization of the base station; and
the user equipment configured to send E-DCH data, stop the uplink synchronization with the base station, and does not trigger uplink synchronization of the base station while sending the E-DCH data, when the sending of E-DCH data from the user equipment temporally overlaps with the uplink synchronization with the base station.

10. A user equipment comprising:
a judgment module configured to judge whether a plurality of Enhanced Dedicated Channel (E-DCH) Random Access Uplink Control Channel (E-RUCCH) transmission processes temporally overlap comprising the steps of:
transmitting an enhanced uplink synchronization code to a base station to trigger at least one of the E-DCH Random Access Uplink Control Channel transmission processes; and
receiving a synchronization command from the base station before transmitting scheduling information to the base station;
a selection module configured to select to perform one of the E-DCH Random Access Uplink Control Channel transmission processes when the judgment module judges overlapping; and
a transmission module configured to return scheduling information and an identifier of the user equipment to the base station over at least one E-DCH Random Access Uplink Control Channel after the E-RUCCH transmission processes is selected;
wherein the plurality of E-DCH Random Access Uplink Control Channel transmission processes comprise the E-DCH Random Access Uplink Control Channel triggered by sending E-DCH data and triggered by uplink synchronization of the base station; and
the user equipment configured to send E-DCH data, stop the uplink synchronization with the base station, and does not trigger uplink synchronization of the base station while sending the E-DCH data, when the sending of E-DCH data from the user equipment temporally overlaps with the uplink synchronization with the base station.

11. The user equipment according to claim 10, wherein:
the selection module selects the highest-priority one of the E-DCH Random Access Uplink Control Channel transmission processes according to their priorities.

12. The user equipment according to claim 11, wherein:
the plurality of E-DCH Random Access Uplink Control Channel transmission processes further comprise an E-DCH Random Access Uplink Control Channel transmission process triggered due to transmission of a cell reselection indicator from the user equipment.

13. The user equipment according to claim 12, wherein:
if the E-DCH Random Access Uplink Control Channel transmission process triggered due to transmission of the cell reselection indicator from the user equipment temporally overlaps with another E-DCH Random Access Uplink Control Channel transmission process, then the selection module selects the E-DCH Random Access Uplink Control Channel transmission process triggered due to transmission of the cell reselection indicator from the user equipment, and stops or cancels all other ongoing E-DCH Random Access Uplink Control Channel transmission processes, and
triggers none of other E-DCH Random Access Uplink Control Channel transmission processes while the E-DCH Random Access Uplink Control Channel transmission process triggered due to transmission of the cell reselection indicator from the user equipment is performed.

14. The user equipment according to claim 10, wherein: the judgment module judges whether the user equipment performs the E-DCH Random Access Uplink Control Channel transmission process triggered due to transmission of the uplink enhanced dedicated channel data from the user equipment after receiving a synchronization command transmitted from the base station and before returning the E-DCH Random Access Uplink Control Channel to the base station to acknowledgment the finished synchronization, and if so, then judge that the E-DCH Random Access Uplink Control Channel transmission process triggered due to transmission of the uplink enhanced dedicated channel data from the user equipment temporally overlaps with the E-DCH Random Access Uplink Control Channel transmission process triggered due to uplink synchronization by the base station.

15. The user equipment according to claim 10, wherein, further comprising: a scheduling information determination module configured to determine, from the amount of data in a buffer area, total enhanced dedicated channel buffer status information in the scheduling information carried over the E-DCH Random Access Uplink Control Channel.

16. The user equipment according to claim 10, further comprising:
- a base station, comprising:
- a reception module configured to receive scheduling information and the identifier of the user equipment returned over the E-DCH Random Access Uplink Control Channel from the user equipment;
- a synchronization determination module configured to determine, from the scheduling information and the identifier of the user equipment received by the reception module, that the user equipment is in the status of uplink synchronization; and
- an assisting scheduling module configured to assist in scheduling by the base station with the scheduling information.

* * * * *